UNITED STATES PATENT OFFICE.

WILHELM HELLWIG, OF MÜNSTEREIFEL, GERMANY.

PROCESS FOR RENDERING PEAT, WOOD-WASTE, AND OTHER VEGETABLE SUBSTANCES SUITABLE FOR THE MANUFACTURE OF PAPER-PULP.

1,121,099.  Specification of Letters Patent.  Patented Dec. 15, 1914.

No Drawing.  Application filed December 16, 1912. Serial No. 736,956.

*To all whom it may concern:*

Be it known that I, WILHELM HELLWIG, a subject of the German Emperor, and a resident of Münstereifel, Rhenish Prussia, Germany, have invented certain new and useful Improvements in the Process for Rendering Peat, Wood-Waste, and other Vegetable Substances Suitable for the Manufacture of Paper-Pulp, of which the following is a specification.

In order to render the fibers contained in peat, wood waste, (such as shavings, sawdust, branches and twigs), straw, bark, the leaves or needles of the *Coniferæ*, dry plants and similar raw material suitable for the manufacture of paper-pulp, the said materials have generally to be boiled with solutions of chemicals under pressure.

Now the present invention has for its object to provide an improved process for "opening" the fibers of the above mentioned materials.

The improved process consists substantially in allowing the material to be treated to remain some considerable time in a warm solution of chlorid of lime, dilute hydrochloric acid and potash or soda. When the solution has acted upon the material to a sufficient degree, which may be ascertained by taking samples and testing same, the material is removed from the solution and boiled with lime water. The resulting mass is then suitable for further treatment for the manufacture of paper.

The following is one example of carrying out the improved process:—10 kilograms of 90 per cent. calcined soda, (carbonate of soda that has been partially de-hydrated by roasting) are dissolved in 100 liters of boiling water. The solution is then boiled for a time, being stirred at intervals. Then 2 kilogs. of chlorid of lime made into a paste with water are added to the boiling mixture. To this mixture when cool, there are slowly added 3 kilogs. of hydrochloric acid of about 20 degrees Bé. The resulting liquor is then ready for opening the fibrous materials to be treated which are placed in the said liquor and allowed to remain therein for about 24 hours. The liquor is preferably warmed. At the end of this period the fibrous materials are removed and introduced into a vessel of boiling water to which about 5 per cent. of burnt lime has been added. The fibrous materials are boiled in this thin lime water for about 2 hours after which the fibrous materials are washed in clean cold water for the purpose of removing as far as possible any free chemicals. The resulting mass is then suitable for further treatment for the manufacture of paper.

Having now described my invention, what I claim as new and desire to secure by Letters Patent is:—

1. A process for rendering peat, woodwaste and other vegetable material suitable for the manufacture of paper and the like, consisting in steeping the raw materials in a solution of soda and chlorid of lime, treating such solution with hydrochloric acid preparatory to steeping the material, and washing such material after steeping.

2. A process for rendering peat, woodwaste and other vegetable material suitable for the manufacture of paper and the like, consisting in steeping the raw materials in a solution of soda and chlorid of lime, treating such solution with hydrochloric acid preparatory to steeping the material boiling the steeped material in lime water, and washing the treated material.

3. A process for rendering peat, wood waste and other vegetable material suitable for the manufacture of paper and the like, consisting in steeping the raw materials in a solution of 10 parts by weight of calcined soda and 2 parts by weight of chlorid of lime in 100 parts by weight of water, treating such solution with 3 parts by weight of dilute hydrochloric acid, of 20° Bé. density, preparatory to steeping the materials, boiling the steeped material in lime water containing 5 per cent. of lime and washing the treated material.

4. A process for rendering peat, wood waste, and other vegetable material suitable for the manufacture of paper and the like, consisting in steeping the raw materials in a warm solution of 10 parts by weight of calcined soda, and 2 parts by weight of chlorid of lime in 100 parts by weight of water; treating such solution with 3 parts by weight of dilute hydrochloric acid of 20° Bé. density preparatory to steeping the materials, boiling the steeped material in lime water containing 5 per cent. of lime and washing the treated material.

5. A process for rendering peat, wood waste and other vegetable material suitable for the manufacture of paper and the like, consisting in steeping the raw materials for 24 hours in a warm solution of 10 parts by weight of calcined soda, and 2 parts by weight of chlorid of lime in 100 parts by weight of water, treating such solution with 3 parts by weight of dilute hydrochloric acid of 20° Bé. preparatory to steeping the materials, boiling the steeped material in lime water containing 5 per cent. of lime and washing the treated material.

Signed at Cologne this fifth day of December 1912.

WILHELM HELLWIG.

Witnesses:
 JACOB PLANTS,
 LOUIS VANDORY.

Copies of this patent may be obtained for five cents each, by addressing the "Commissioner of Patents, Washington, D. C."